United States Patent
Hartenstein et al.

(10) Patent No.: US 6,711,470 B1
(45) Date of Patent: Mar. 23, 2004

(54) METHOD, SYSTEM AND APPARATUS FOR MONITORING AND ADJUSTING THE QUALITY OF INDOOR AIR

(75) Inventors: Steven D. Hartenstein, Idaho Falls, ID (US); Paul L. Tremblay, Idaho Falls, ID (US); Michael O. Fryer, Roberts, ID (US); Frederick A. Hohorst, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 512 days.

(21) Appl. No.: 09/717,180

(22) Filed: Nov. 16, 2000

(51) Int. Cl.[7] .................. G05B 13/00; G05D 23/00; F24F 7/00
(52) U.S. Cl. .............. 700/276; 700/266; 236/49.3; 454/229; 702/23
(58) Field of Search ............... 700/266, 271, 700/276, 277, 299, 300; 702/23, 30, 31; 165/200, 201; 236/49.3; 454/229

(56) References Cited

U.S. PATENT DOCUMENTS

| | | | | |
|---|---|---|---|---|
| 4,499,377 A | | 2/1985 | Presser | 250/343 |
| 4,605,160 A | * | 8/1986 | Day | 236/13 |
| 4,665,385 A | | 5/1987 | Henderson | 340/539.26 |
| 4,803,554 A | * | 2/1989 | Pape | 348/231.6 |
| 4,850,264 A | * | 7/1989 | Kiser | 454/255 |
| 5,074,137 A | | 12/1991 | Harris et al. | 73/31.02 |
| 5,172,856 A | | 12/1992 | Tanaka et al. | 236/49.3 |
| 5,187,943 A | | 2/1993 | Taniguchi et al. | 62/180 |
| 5,261,596 A | * | 11/1993 | Tachibana et al. | 236/49.3 |
| 5,291,748 A | | 3/1994 | Ueda | 62/179 |
| 5,292,280 A | | 3/1994 | Janu et al. | 454/229 |
| 5,394,934 A | | 3/1995 | Rein et al. | 165/200 |
| 5,452,234 A | * | 9/1995 | Heath et al. | 702/22 |
| 5,520,328 A | | 5/1996 | Bujak, Jr. | 236/44 A |
| 5,553,006 A | * | 9/1996 | Benda | 700/276 |
| 5,590,830 A | * | 1/1997 | Kettler et al. | 236/49.3 |
| 5,596,507 A | | 1/1997 | Jones et al. | 700/276 |
| 5,606,495 A | * | 2/1997 | Jaidka | 700/79 |
| 5,627,328 A | | 5/1997 | Sheridan et al. | |
| 5,682,329 A | | 10/1997 | Seem et al. | 700/276 |

(List continued on next page.)

Primary Examiner—Leo Picard
Assistant Examiner—Paul Rodriguez
(74) Attorney, Agent, or Firm—Trask Britt PC

(57) ABSTRACT

A system, method and apparatus is provided for monitoring and adjusting the quality of indoor air. A sensor array senses an air sample from the indoor air and analyzes the air sample to obtain signatures representative of contaminants in the air sample. When the level or type of contaminant poses a threat or hazard to the occupants, the present invention takes corrective actions which may include introducing additional fresh air. The corrective actions taken are intended to promote overall health of personnel, prevent personnel from being overexposed to hazardous contaminants and minimize the cost of operating the HVAC system. The identification of the contaminants is performed by comparing the signatures provided by the sensor array with a database of known signatures. Upon identification, the system takes corrective actions based on the level of contaminant present. The present invention is capable of learning the identity of previously unknown contaminants, which increases its ability to identify contaminants in the future. Indoor air quality is assured by monitoring the contaminants not only in the indoor air, but also in the outdoor air and the air which is to be recirculated. The present invention is easily adaptable to new and existing HVAC systems. In sum, the present invention is able to monitor and adjust the quality of indoor air in real time by sensing the level and type of contaminants present in indoor air, outdoor and recirculated air, providing an intelligent decision about the quality of the air, and minimizing the cost of operating an HVAC system.

41 Claims, 7 Drawing Sheets

U.S. PATENT DOCUMENTS

| | | | |
|---|---|---|---|
| 5,707,005 A | 1/1998 | Kettler et al. | 236/49.3 |
| 5,727,131 A | 3/1998 | Nakamura et al. | 706/23 |
| 5,742,516 A | 4/1998 | Olcerst | 700/276 |
| 5,751,916 A | 5/1998 | Kon et al. | 706/2 |
| 5,768,372 A * | 6/1998 | Sung et al. | 713/193 |
| 5,786,767 A | 7/1998 | Severino | 340/628 |
| 5,791,236 A | 8/1998 | Schouten | 99/468 |
| 5,793,296 A | 8/1998 | Lewkowicz | 340/632 |
| 5,798,945 A | 8/1998 | Benda | 702/24 |
| 5,801,317 A | 9/1998 | Liston et al. | 73/863.81 |
| 5,801,633 A | 9/1998 | Soni | 340/628 |
| 5,832,411 A * | 11/1998 | Schatzmann et al. | 702/23 |
| 5,892,690 A | 4/1999 | Boatman et al. | |
| 6,035,246 A * | 3/2000 | Wagner | 700/266 |
| 6,385,510 B1 * | 5/2002 | Hoog et al. | 700/276 |

\* cited by examiner

METHOD, SYSTEM AND APPARATUS FOR MONITORING AND ADJUSTING THE QUALITY OF INDOOR AIR

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates to methods, systems and apparatus for monitoring and adjusting indoor air quality. More specifically, the present invention relates to methods and apparatus for monitoring and adjusting indoor air quality by sensing and removing indoor air contaminants.

2. Present State of the Art

Heating, Ventilation, and Air Conditioning (HVAC) systems can be designed to control the temperature and humidity of indoor air by combining fresh outside air with recirculated inside air. This process is tempered by air heating and cooling costs. The quality of the indoor air is usually determined by the temperature and humidity of the air. Typically, the ratio of outside air to inside air is fixed and adjustments to the ratio are usually made manually when there is concern about the quality of the indoor air.

HVAC systems relying on the manual adjustment of the ratio between outside air and recirculated indoor air are not economically optimized and have the potential to subject personnel to unknown hazardous contaminants. For example, when the indoor air quality is very good, the HVAC system draws and conditions more outside air than is needed, which increases cost because the excess outside air has to be heated and conditioned. When air quality is poor, not enough outside air is drawn into the system resulting in health risks to personnel, which in turn leads to increased costs due to overexposed personnel, loss of productivity, and increased facility maintenance.

More advanced HVAC system have the added ability to sense particulates, Volatile Organic Compounds (VOC), and carbon dioxide but do not address hazards from exposure to a wide range of contaminants. The ability to sense particulates and carbon dioxide has improved the efficiency of HVAC systems, but not all problems have been solved. In fact, numerous instances of workplace problems related to the quality of indoor air have been recorded. The recirculation of indoor air can permit odors and toxic gases to concentrate over time and ultimately leads to unhealthy indoor air. The sources of these contaminants can include: facility infrastructure such as carpet, paints, and furniture; electrical equipment such as photocopiers, video monitors and ovens; cleaning equipment and supplies; mechanical equipment fuels, lubricants and combustion byproducts; the use of tobacco and perfumes by personnel; and natural microbes such as those found in drains, vents and crawl spaces.

Most of the recorded incidents related to poor indoor air equality were attributed to air contaminated with volatile organic compounds (VOC) from paints, adhesives and polishes along with nitrogen containing compounds such as nitric acid, nitrogen dioxide, and ammonia. These incidents occur because most HVAC systems are maintained by manually altering the indoor airflow and recycling rates based on personal observations and experience with odors, hazes, and weather conditions. However, none of these systems provide a mechanism to recognize when non-visible or non-odorous contaminants are present. If the control of any of these rates is controlled automatically, it is typically based on some combination of humidity, temperature, smoke and carbon dioxide. Routine monitoring and control of regulated contaminants specified in the American Society of Heating, Refrigerating and Air Conditioning Engineers (ASHRAE) Standard 62—and its revisions is rare. Further, these systems do not take into account the status or quality of the outside air being introduced into the system.

The Clean Air Act of 1970 required the Environmental Protection Agency (EPA) to establish National Ambient Air Quality Standards (NAAQS) for the six most significant air pollutants in the outdoor environment: sulfur dioxide, nitrogen dioxide, carbon monoxide, ozone, lead, and particulate matter with a diameter less than or equal to 10 micrometers. Of these pollutants, sulfur dioxide, nitrogen dioxide, carbon monoxide and ozone are colorless at very low concentrations and significantly and adversely affect human health. Current HVAC systems usually presume the outside air to be free of contaminants and do not monitor or make adjustments for these or other contaminants.

In addition to the contaminants and pollutants found in outside air, many other contaminants can be the cause of harmful indoor air. Currently, general indoor air quality is not regulated, but many agencies have proposed standards which may serve as guidelines. Standards have been proposed by the U.S. Department of Labor's Occupational Safety and Health Administration (OSHA), the World Health Organization (WHO), and ASHRAE. The pollutants and contaminants these standards propose regulating include: carbon dioxide, carbon monoxide, formaldehyde, nitrogen dioxide, ozone, radon and progeny, sulfur dioxide, and a number of VOCs. In addition to these contaminants, many other chemicals are regulated by OSHA in work environments to control long and short-term exposures.

As noted above, HVAC manufacturers typically purchase sensors to monitor temperature, smoke, humidity and carbon dioxide. Providing additional sensors to monitor all potentially harmful contaminants is rare and expensive because of the cost of providing sensors for each contaminant. The addition of charcoal filters, water scrubbers, and reductant/oxidant scrubbers as a means of ensuring good indoor air is also impractical because they have a limited capacity that is exhausted rapidly during continuous operation. In other words, it is impractical to provide a sensor or filter for each contaminant and pollutant. There remains a need, however, to sense poor indoor air quality and make adjustments to the indoor air such that human health is preserved and economic costs are lowered.

OBJECTS AND SUMMARY OF THE INVENTION

The present invention has been developed in response to the present state of the art, and in particular, in response to these and other problems and needs that have not been fully or completely solved by currently available HVAC systems for monitoring and adjusting the quality of indoor air. Thus, it is an overall object of the present invention to provide a method, system and apparatus for reliably monitoring and adjusting the quality of indoor air.

It is therefore an object of one embodiment of the present invention to monitor abnormal conditions indicative of unhealthy air.

It is another object of one embodiment of the present invention to monitor and adjust the quality of indoor air.

It is a further object of one embodiment of the present invention to minimize heating and cooling costs.

It is an additional object of one embodiment of the present invention to protect humans from over exposure to hazardous air pollutants.

It is another object of one embodiment of the present invention to identify contaminants and pollutants in the indoor air.

It is a further object of one embodiment of the present invention to infer the identity of contaminants and pollutants in the indoor air.

Yet another object of one embodiment of the present invention is to determine when alternative air supplies or mitigation processes should be used to provide healthy indoor air.

In summary, the foregoing and other objects are achieved by providing a method and apparatus for monitoring and adjusting the quality of indoor air. In one embodiment of the present invention a sensor array is provided which is capable of sensing a variety of contaminants. Each contaminant or mixture of contaminants may cause the individual sensors in the sensor array to produce a particular sensor signature or output. Further, each contaminant also causes the sensors to produce an array signature. Both the sensor signatures and the array signatures can be indicative of particular contaminants.

In this manner, personnel can be protected from over exposure to toxic substances and the costs associated with heating, cooling, and humidifying the air can be minimized. Another embodiment also monitors the outside air to ensure that harmful contaminants are not introduced from the outside air.

The signatures are sent to a processing unit which compares the signatures to a database or library of known signatures. Based on this comparison, the contaminant is identified or the identity of the contaminant is inferred. Once identified, the system evaluates the level of hazard presented by the contaminant and takes corrective action to remove the contaminant from the indoor air. An exemplary corrective action is to adjust the ratio of outside air mixed with recycled inside air to reduce the concentration of the contaminant to an acceptable level.

The combination of sensors and the database of signatures enables the present invention to monitor a number of contaminants beyond the contaminants that the sensors can monitor individually. Effectively, the sensor array can be represented by an n-dimensional space. The signatures of various contaminants are mapped within this n-dimensional space. The signatures of known contaminants are stored in a database and the signatures of sensed contaminants are compared to that database. The n-dimensions permit the identity of unknown contaminants to be inferred if the signature of the unknown contaminant is spatially near the signature of a known contaminant.

By adding more dimensions to the sensor array, which is done by adding additional senors, the accuracy of identifying the contaminant is increased. In an n-dimensional database, the interpolation between database points, which represent contaminants, is easily done and quite accurate because the points are not far apart spatially. Also, the n-dimensions of the database allows for more separation between the clusters of points, which results in better accuracy and the possibility of storing data on more contaminants. The present invention is also capable of learning to identify new contaminants and the database of known contaminants and pollutants can continually be updated and increased.

Another embodiment of the present invention is that the system can decide which sources of air to use to assure healthy indoor air. The source could be another outside air inlet vent, mitigated recirculated indoor air, or a reservoir of purified air. If the source of air is unacceptable, the contaminants are first removed or reduced before the air is introduced into the system. This is accomplished by sensing the contaminants present in the air and then passing the air through a series of modules or filters which strip the contaminants from the air before the air is mixed and introduced into the system. In a preferred embodiment, the modules or filters are active only when contaminants are present in the outside air or the recirculated air.

One embodiment of the sensors array is capable of sensing a wide variety of contaminants including but not limited to carbon dioxide, carbon monoxide, sulfur dioxide, hydrogen sulfide, nitrogen oxides and a variety of volatile organics. In addition to these contaminants, the humidity, pressure and temperature of the air also monitored. In some cases, other specific sensors maybe added when the specific location has a historical record of other ambient contaminants.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention provides system, apparatus and methods for monitoring and adjusting the quality of indoor air and is adaptable to new and existing HVAC systems. The quality of air is evaluated based on the quantity of contaminants present in the air. As used herein, contaminants includes but is not limited to pollutants, chemicals, particulates, smoke, bacteria, viruses, humidity, temperature as well as other substances or conditions which may or may not lead to poor air quality. Contaminant also refers to the substances listed in the indoor air quality standards proposed by OSHA, WHO, ASHRAE, and other organizations.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EPROM, EEPROM, CDROM, or other optical disk storage, magnetic disk storage or other magnetic storage devices, or any other medium which can be used to store the desired executable instructions or data structures and which can be accessed by a general purpose or special purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
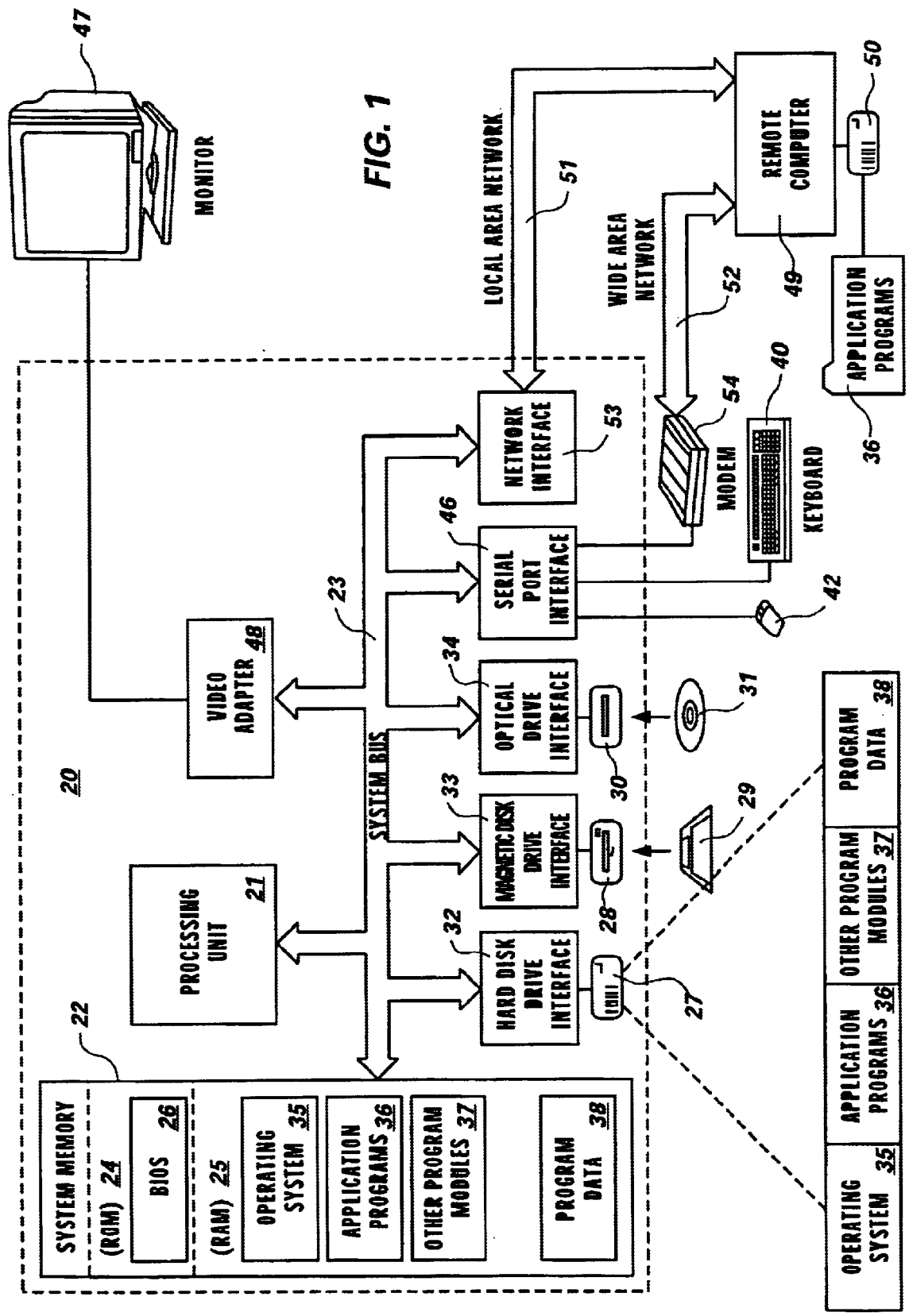
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers, and remote applications that include a LonWorks® type of communications system for indirect connection or for direct serial or parallel port connections to remote sensors, available from Echelon Corp of San Jose, Calif. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

Computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
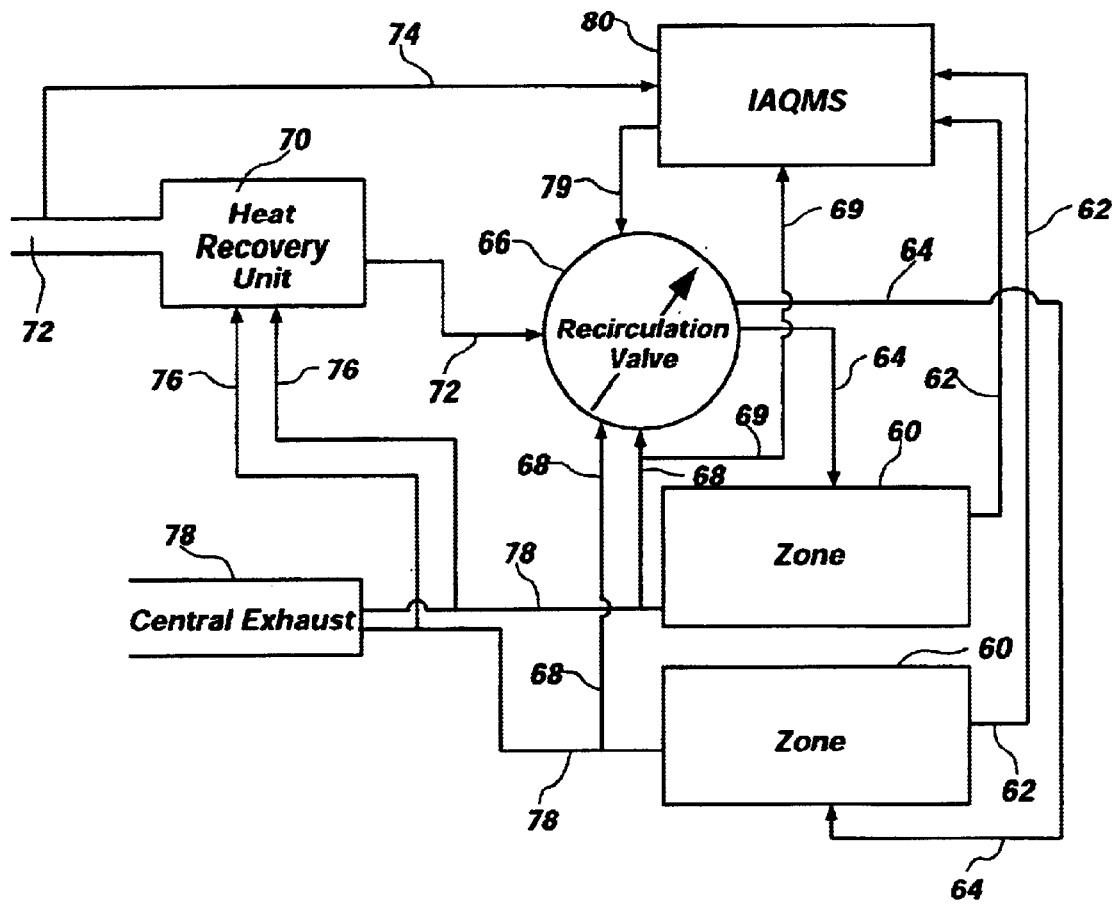
FIG. 2 is an illustration of one embodiment of the present invention adapted to a heating, ventilation and air condition system.

FIG. 2 is a block diagram of an exemplary system implementing one embodiment of the present invention. In FIG. 2, each zone 60 represents an area being heated, cooled, or conditioned using a HVAC system or other system. As used herein, zone may refer to an entire building, a floor of a building, part of a floor of a building, or any other area which has a heating, cooling or air conditioning system. Each zone 60 may be in the same building or in separate buildings. Both the outside air and the recirculated air are considered zones. A zone comprises any area from which an air sample is taken and there may be multiple sources of outside or makeup air to be selected. Indoor Air Quality Monitoring System (IAQMS) 80 may monitor multiple sources of inside air from different zones, multiple sources of outside air, and multiple sources of recirculating air. Multiple systems may also be used in a single facility, based on the size of the HVAC system and the level of monitoring needed or desired.

Each zone 60 has a supply air 64 and supply air 64 may come from multiple potential sources, including the outside air, a reservoir of clean air or recirculated air. Each zone 60 also has a central exhaust 78. Central exhaust 78 further comprises an alternate exhaust 76. Alternate exhaust 76 leads to a heat recovery unit 70 where the heat from the indoor air is transferred to outside air 72 which will be introduced into each zone 60 within the HVAC system. Central exhaust 78 also comprises recirculated air 68, which is fed to recirculation valve 66. At recirculation valve 66, recirculated air 68 is combined with outdoor air 72 coming from heat recovery unit 70. Recirculation valve 66 outputs supply air 64, which is typically a mixture of outside air 72 and recirculated air 68, to each zone 60.

IAQMS 80 in one embodiment, monitors and adjusts the quality of the air present in each zone 60. IAQMS 80, described in more detail with reference to FIG. 3, has a plurality of air samplers including an outdoor air sampler 74, a recirculated air sampler 69, and a plurality of zone samplers 62. IAQMS 80 may comprise additional air samplers depending on the quantity of outdoor and recirculated air sources. Outdoor air sampler 74 is an example of means for sampling and monitoring the quality of the outdoor air. Each zone sampler 62 is an example of means for sampling and monitoring the quality of the indoor air for each zone 60. Recirculated air sampler 69 is an example of means for sampling and monitoring the quality of recirculated air 68 which is to be recycled and reintroduced to the system. One embodiment of each air sampler is a tube connecting sensor array 82 to the air to be sampled. The placement of each air sampler can vary. For example, the air samples can be physically located in the zones, or in the duct work of the system in order to cover remote applications. IAQMS 80 further comprises valve control 79, which adjusts recirculation valve 66 such that the ratio of recirculated air 68 and outdoor air 72 varies. FIG. 2 is an example of an air delivery system which is connected to IAQMS 80.

Figure 3:
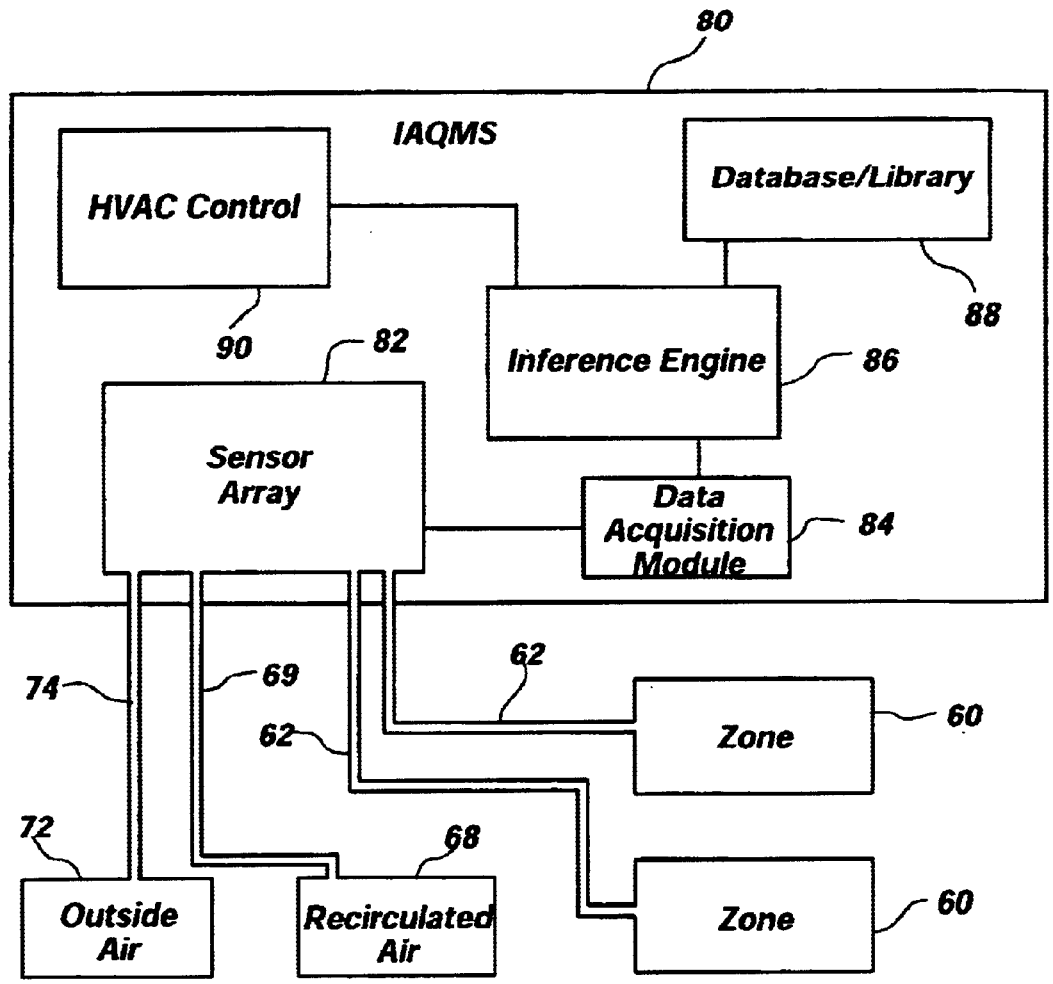
FIG. 3 is an illustration of one embodiment of an indoor air quality management system.

FIG. 3 is a block diagram of one embodiment of an IAQMS 80. IAQMS 80 monitors the indoor air quality of each zone 60 using sensor array 82. The embodiment illustrated in FIG. 3 comprises a single sensor array 82. Other embodiments contemplate a separate sensor array 82 located in each zone 60, a sensor array 82 to test outside air 72, and a sensor array 82 to test recirculated air 68. The information gathered by the sensor arrays would then be sent to IAQMS 80 for analysis. In the embodiment illustrated in FIG. 3, sensor array 82 is connected to a plurality of zone samplers 62, outdoor air sampler 74 and recirculated air sampler 69. Each zone sampler 62 provides sensor array 82 access to the indoor air located with the respective zone 60. Outdoor air sampler 74 provides sensor array 82 access to the outdoor air and recirculated air sampler 69 provides sensor array 82 access to the recirculated air. In a preferred embodiment, sensor array 82 has access to only one air sampler at a time such that IAQMS 80 knows the location of the air that is being sampled or tested for contaminants. Sensor array 82 is an example of sensing means for evaluating an air sample.

Embodiments of sensor array 82 can include any number of sensors including one sensor. A preferred embodiment of sensor array 82 comprises sensors for carbon dioxide, carbon monoxide, hydrogen sulfide, nitrogen oxides, volatile organics, sulfur dioxide, relative humidity, pressure and temperature. A key advantage of these sensors is that the sensors selected for the IAQMS are readily available and inexpensive, as well as stable and rapid so that adjustments to the quality of the indoor air can be made in real time. Another key advantage of these sensors is that they embody varying transducer principles allowing the sensors to respond selectively to the contaminants of interest, yet broad-based to respond to other contaminants. This is significant to allow the IAQMS to respond to a wide variety of expected and unexpected contaminants while controlling the system to conserve energy and reduce costs.

In other words, the sensors selected for inclusion in sensor array 82 are chosen for reasons related to cost, availability, regulated contaminants, response time, and other reasons. Other sensors can be included in sensor array 82, as regulations change or specific hazards become known in a particular environment. An example would be an ammonia sensor in a facility near a feed lot or sewage processing area.

ASHRAE specifies that an HVAC system use either minimum air flow/exchange rates or performance-based methods to achieve acceptable indoor air quality. A sensor that takes a significant amount of time to make a measurement is impractical and cannot satisfy either of these requirements. The number of sensors in sensor array 82, however, can be expanded or decreased. IAQMS functions by recognizing when contaminants reach concentration levels determined to be harmful and therefore need to be reduced to acceptable levels. The need for the IAQMS is based on the consideration that low levels of most contaminants exist in most locations at levels that are not considered hazardous.

Because there are many different contaminants that may be hazardous, sensors array 82 can detect contaminants that may not be detected by the individual sensors. For example, even though an ozone specific sensor is not included in sensor array 82, sensor array 82 is capable of detecting not only ozone, but a wide variety of contaminants. For example, the sensor used to detect nitrogen dioxide generates a positive voltage in proportion to the amount of nitrogen dioxide detected. This same sensor produces a negative voltage in proportion to the amount of ozone detected. This negative voltage is recognized as a trait of ozone and is an indication of a sensor response to a specific contaminant and concentration of the contaminant. Responses of the additional sensors to the same contaminant serve to confirm the presence and concentration of the contaminant. In combination as the sensor array, the indication of a response and the magnitude of the response for each sensor serves as an array signature which indicates the presence of a contaminant and the magnitude indicates the quantity or concentration of the contaminant. IAQMS 80 can infer that ozone is present and in a recognizable quantity due to the response of sensor array 82. The aggregate response of sensor array 82 to this particular contaminant is an array signature. The response of a single sensor to a particular contaminant is a sensor signature.

The array signature of sensor array 82 is important because the sensors are designed for certain contaminants. As mentioned above, however, the sensors respond to other contaminants. By exposing sensor array 82 to various contaminants and observing the response of sensor array 82 to those contaminants, the ability of IAQMS 80 to identify contaminants is expanded beyond what contaminants the sensors can identify individually. Also, database 88 is created and expanded by exposing sensor array 82 to different contaminants and storing the array signature.

It is clearly difficult to identify a wide variety of contaminants using a single sensor because most sensors provide only a magnitude of response. When used in an array, the direction, shape, and magnitude of the response can be used to fingerprint as well as identify and locate the contaminant. The array signature, which is produced in part by these characteristics, is substantially more unique for a given contaminant. For example, if the sensors consisted of a carbon dioxide sensor, a volatile organic sensor and a sulfur dioxide sensor, then the response of these three sensors to various contaminants can be mapped to a three dimensional space. This is analogous to an array signature for the contaminant. Using a three dimensional space, contaminants that have an array signature spatially near the array signature of other known contaminants can be presumed hazardous and the identity of the contaminant can be inferred. A system having n sensors places the array signatures of various contaminants in an n dimensional space. The additional dimensions allows for more accurate identification of indoor air contaminants. By learning the array signature of additional contaminants, IAQMS 80 can learn to identify a wide variety of contaminants.

As described above, sensor array 82 can be implemented in a variety of ways. One embodiment has a single sensor array attached to tubes or conduits that have access to the air of various zones, the outdoor air and the recirculated air. When sensor array 82 is testing or sampling the air from a particular zone, only the air from that sampling point is exposed to sensor array 82. Upon obtaining an air sample, data acquisition 84 performs signal preprocessing, analog/digital conversions, and system communication. Once the sensor signatures and the array signatures are obtained, they are sent to inference engine 86. Inference engine 86 compares the sensor signatures and the array signatures received from sensor array 82 with known sensor signatures and known array signatures stored in signature database 88. Inference engine 86 is an example of processor means for comparing sensor signatures and array signatures with known sensor signatures and known array signatures.

Figure 4:
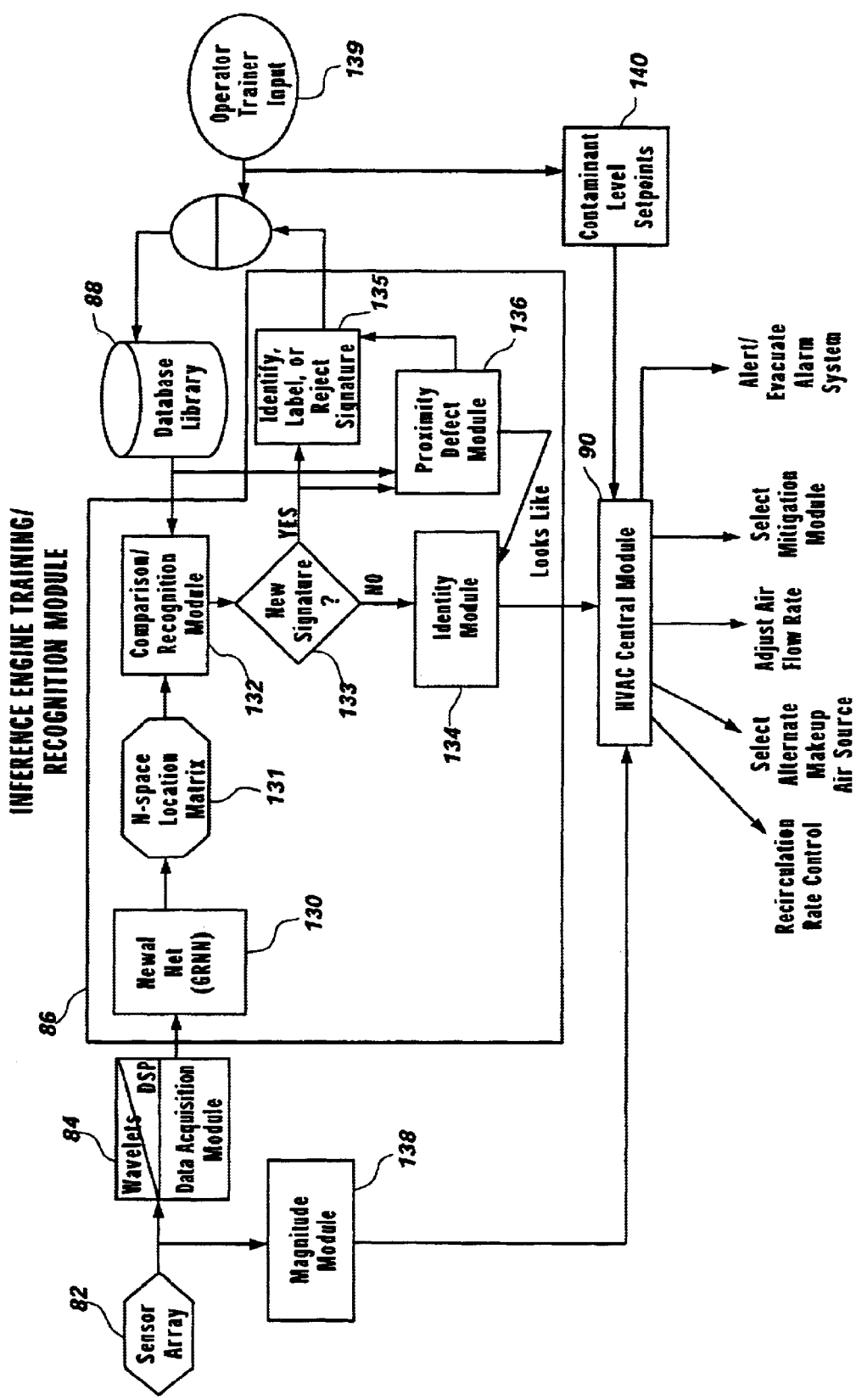
FIG. 4 is a block diagram illustrating a process of deciding which source of air or mitigation processes is selected for sampled conditions and is a more detailed view of part of an indoor air quality management system.

FIG. 4 is an illustration of inference engine 86 and its interaction as part of IAQMS 80. Sensor array 82 produces an output, which is sent to data acquisition module 84. Data acquisition module 84 functions to produce an array signature which is indicative of the contaminants in the air sampled by sensor array 82. Data acquisition module 84 may employ compression and decompression techniques as well as analog/digital signal conversions. This information is then passed to inference engine 86. In this embodiment, inference engine 86 receives the information through a newel neural net 130. Next, the array signature is placed within the n-dimensional space by matrix 131. Recognition module 132 compares the array signature in matrix 131 with the array signatures in database 88. If this comparison is a new signature in step 133, then the array signature is labeled or rejected in step 135. If the comparison produces a known signature, then identity module 134 identifies the contaminant and HVAC control 90 then takes corrective actions, which may include adjusting the recirculation rate, selecting an alternative outside or makeup air source, adjusting the air flow rate, selecting a mitigation module, or issuing an alert or evacuation signal. If a new signature is indicated in step 133, then the spatial proximity of the array signature of the unknown contaminant to other known contaminants is used to identify the hazard associated with the unknown contaminant in proximity module 136. Proximity module 136 will infer the hazard of the unknown contaminant in identity module 134. HVAC control 90 then takes corrective actions as previously indicated.

In FIG. 4, IAQMS 80 permits operator input 139. Operator input 139 permits acceptable contaminant levels to be set, permits database 88 to be updated and allows unknown or new signatures to be identified in step 135 and entered into database 88. The contaminant levels are connected with HVAC control 90. In this manner, inference engine 86 is able to increase its ability to identify previously unknown contaminants as well as infer the hazard associated with those unknown contaminants and take corrective actions.

In one embodiment, signature database 88 contains the n dimensional array signatures for a wide variety of contaminants it is trained to identify. IAQMS 80 has the capability to learn to recognize the array signatures of previously unknown contaminants. In this manner, signature database 88 can be updated and IAQMS 80 is therefore capable of of learning and increasing its ability to identify contaminants and take corrective action. It then infers the level of hazard from the proximity in n-space to known contaminants in the database. Signature database 88 is a library of contaminant signatures. Some of the contaminants may or may not be related to unhealthy indoor air.

The signatures stored in signature database 88 may be stored in a compressed form or format using compression techniques well known in the art. The comparison between signatures provided by sensor array 82 and the signatures stored in signature database 88 may involve a compression/decompression technique well known in the art. Signature database 88 can take the form of a programmable EPROM, a CDROM or other form. As more contaminants are learned, signature database 88 can be updated with a new EPROM or CDROM. Signature database 88 is preferably stored in an EPROM for several reasons. First, EPROMs can be removed and replaced easily and inexpensively. Second, the physical location of the system may make the use of a keyboard and a monitor difficult. Thus an EPROM is a convenient manner of updating signature database 88.

As mentioned earlier, many contaminants that are known to be hazardous have a known signature located in the n-dimensional space. If an unknown contaminant has an array signature that is spatially near the array signature of a known hazardous contaminant, then inference engine 86 presumes the contaminant to be hazardous and takes corrective action. For the safety of personnel exposed to the indoor air, it is important to understand that any array signature that is not within a normal range of array signatures is presumed to be hazardous. In other words, any off normal array signature is presumed harmful.

Corrective action is taken by having inference engine 86 issue commands to HVAC control 90. These commands may include increasing the amount of outside air that is mixed with the recirculated air and introduced into the system. The corrective response is automatic and prevents people from being overexposed to undesirable levels determined to be hazardous by regulation, guidelines or personal preferences. As discussed above, there are no regulated requirements for indoor air quality. Various groups have proposed various standards and IAQMS 80 preferably takes corrective action before the contaminants or pollutants in the indoor air reach those levels. For example, corrective action may be taken when the contaminants or pollutants in the indoor reach 80 percent of the proposed ASHRAE standards. HVAC control 90 is an example of control means for adjusting the indoor air quality. HVAC control 90 implements corrective actions indicated by inference engine 86.

Typically, one solution to removing contaminants in indoor air is to increase the amount of presumably fresh outdoor air. Outdoor air is not always fresh, however, and may introduce more contaminants that it removes. For this reason, sensor array 82 or IAQMS 80 also has an outdoor air sampler 74, through which the outdoor air is sampled and sensed using sensor array 82. If the outdoor air contains contaminants, those contaminants must be removed or mitigated before the outdoor air is introduced and mixed with the indoor air or an alternate outdoor air source can be selected. A similar process occurs with the air to be recirculated. IAQMS 80 has recirculated air sampler 69, which permits sensor array 82 to sample the recirculated air. If the recirculated air contains an unacceptable level of contaminants, those contaminants must be removed or mitigated before the recirculated air is actually introduced into the system. IAQMS 80 may also increase the amount of indoor air recirculated if the recirculated air is less hazardous.

Figure 5:
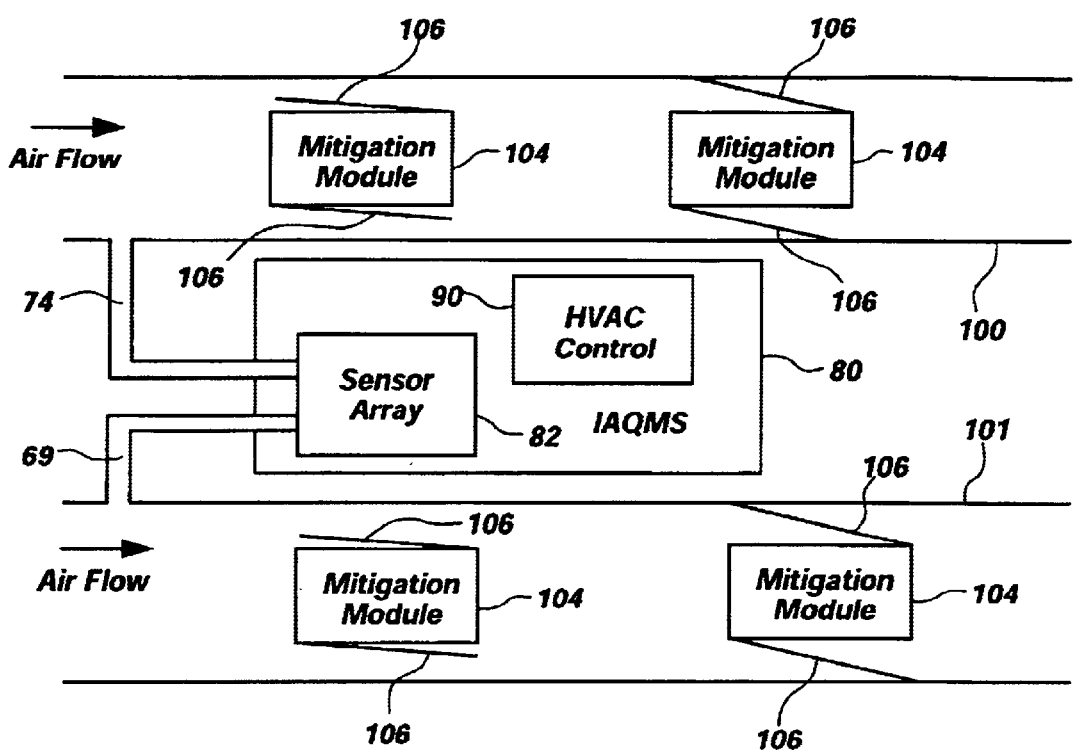
FIG. 5 is an illustration of one embodiment of modules for monitoring and adjusting the outdoor air quality and the recirculated air quality.

FIG. 5 illustrates how contaminants in the outside air or in the recirculated air may be removed or mitigated. Outdoor air intake 100 is illustrated in FIG. 5 as having or containing a plurality of mitigation modules 104. In one embodiment, each mitigation module 104 has two flaps 106. Sensor array 82 first samples the outdoor air via outdoor air sampler 74. If IAQMS 80 determines that the outdoor air contains unacceptable contaminants, then IAQMS 80, via HVAC control 90, activates mitigation modules 104 in outdoor air intake 100.

A similar process occurs for the recirculated air where sensor array 82 samples the recirculated air via recirculated air sampler 69. If IAQMS 80 determines that the recirculated air contains unacceptable contaminants, then IAQMS 80, via HVAC control 90, activates mitigation modules 104 in recirculated air intake 101 to remove the contaminants in the recirculated air.

Mitigation module 104 is an apparatus which is able to strip contaminants from the air. In order to strip the contaminants from the outdoor air or the recirculated air, mitigation modules 104 are designed or positioned such that the air flow passes through mitigation module 104. In the embodiment illustrated in FIG. 5, mitigation module 104 has two flaps 106 which extend out from mitigation module 104 such that the outdoor air is directed through mitigation module 104.

Each mitigation module 104 is designed to strip certain contaminants from the air which passes through them. For example, the first mitigation module 104 may be designed to strip ammonia from the air. Another mitigation module 104 may be designed to strip volatile organic compounds from the air. In one embodiment, the only mitigation modules activated are those indicated by the signatures of the contaminants present in the air as indicated by sensor array 82. Some methods used to strip contaminants from the air are well known in the prior art, but opportunity exists to utilize novel or state-of-the-art techniques. Mitigation modules 104 are only activated when sensor array 82 indicates that contaminants are present. When contaminants are no longer present or are not at levels recognized as undesirable, flaps 106 are closed and the air flow no longer passes through mitigation modules 104.

Figure 6:
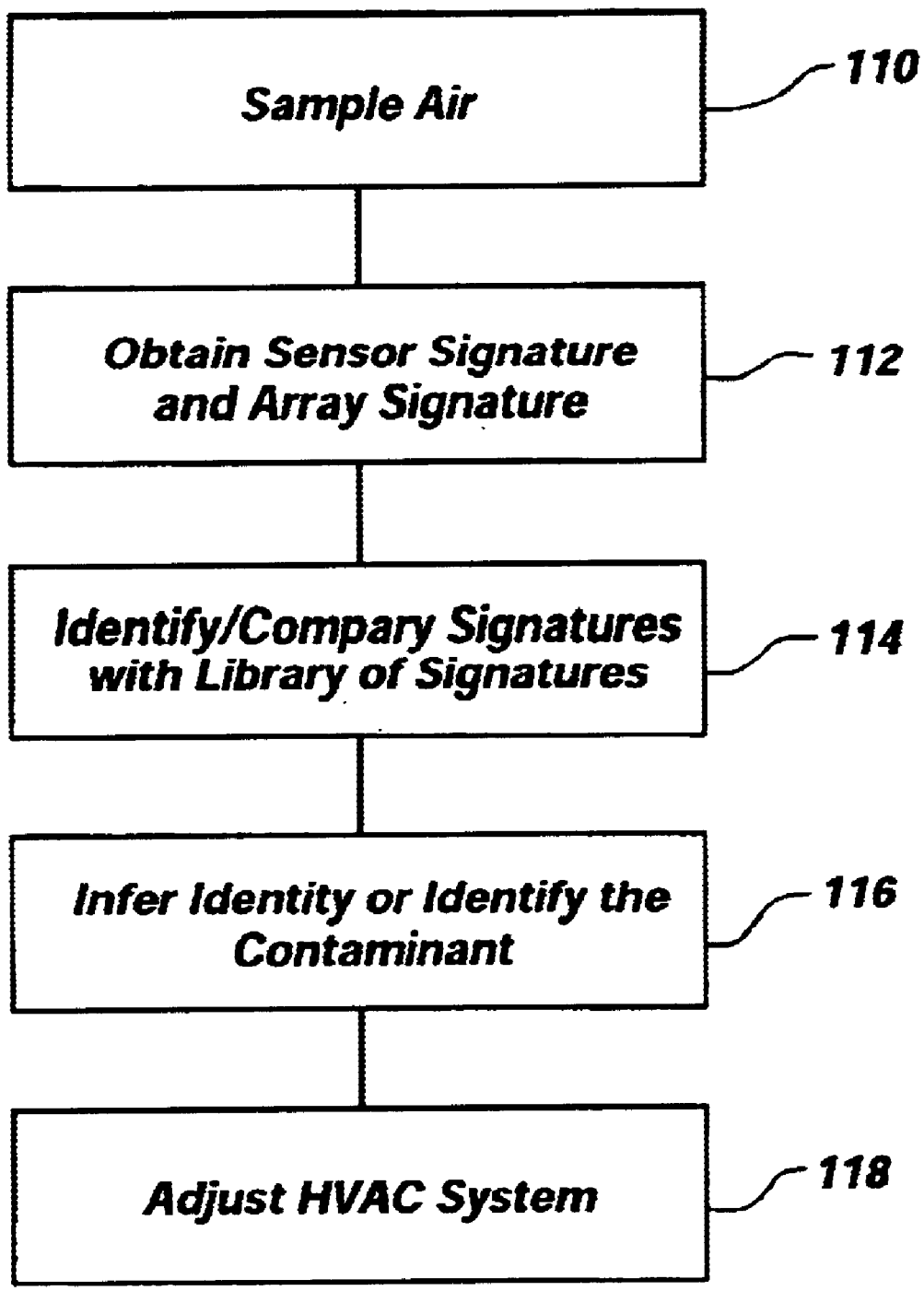
FIG. 6 is a flow chart of one embodiment of a method for monitoring and adjusting indoor air quality.

FIG. 6 is a flow diagram of a method of monitoring and adjusting the quality of indoor air. In step 110, an air sample is taken. The air sample can be a sample of outdoor air, a sample of indoor air, a sample of recirculated air, or a sample air from a zone. In the embodiment illustrated in FIG. 2, only one air sample is taken at a time. In embodiments having a plurality of sensor arrays, the air sample is specific to the particular sensor array.

In step 112, the individual sensor signatures and the array signature of the contaminants in the air sample are obtained. As described earlier, the array signature is represented in an n-dimensional space where n is either the number of sensors in the sensor array or the aggregate of responses from point and spectral sensors. These signatures are compared with a library or database of known signatures in step 114.

In step 116, contaminants for which the individual sensors were designed will easily be detected and identified. Contaminants that the system has learned or that have a signature stored in the database will also be identified, and the hazards of unknown contaminants will be inferred according to the spatial proximity to locations of array signatures known within the n-dimensional space in step 116. In step 116, the contaminants in the air sample are either identified or an inference as to their identity is made. The hazard or health risk associated with the contaminant is also identified and in step 118, corrective action is taken using HVAC controls.

The corrective actions can include activating certain mitigation modules to strip particular contaminants from the incoming outdoor air, increasing the percentage of outdoor air that is introduced to the system, or reducing the percentage of outdoor air that is introduced to the system when the IAQMS indicates that indoor air quality is very good, or switch to an alternative air supply reservoir of good air. Other corrective actions include identifying the source or location of the contaminant, replacing the indoor air of a particular zone or increasing the temperature of the air. The corrective actions taken are intended to promote overall health of personnel, prevent personnel from being overexposed to hazardous contaminants and minimize the cost of operating the HVAC system.

Figure 7:
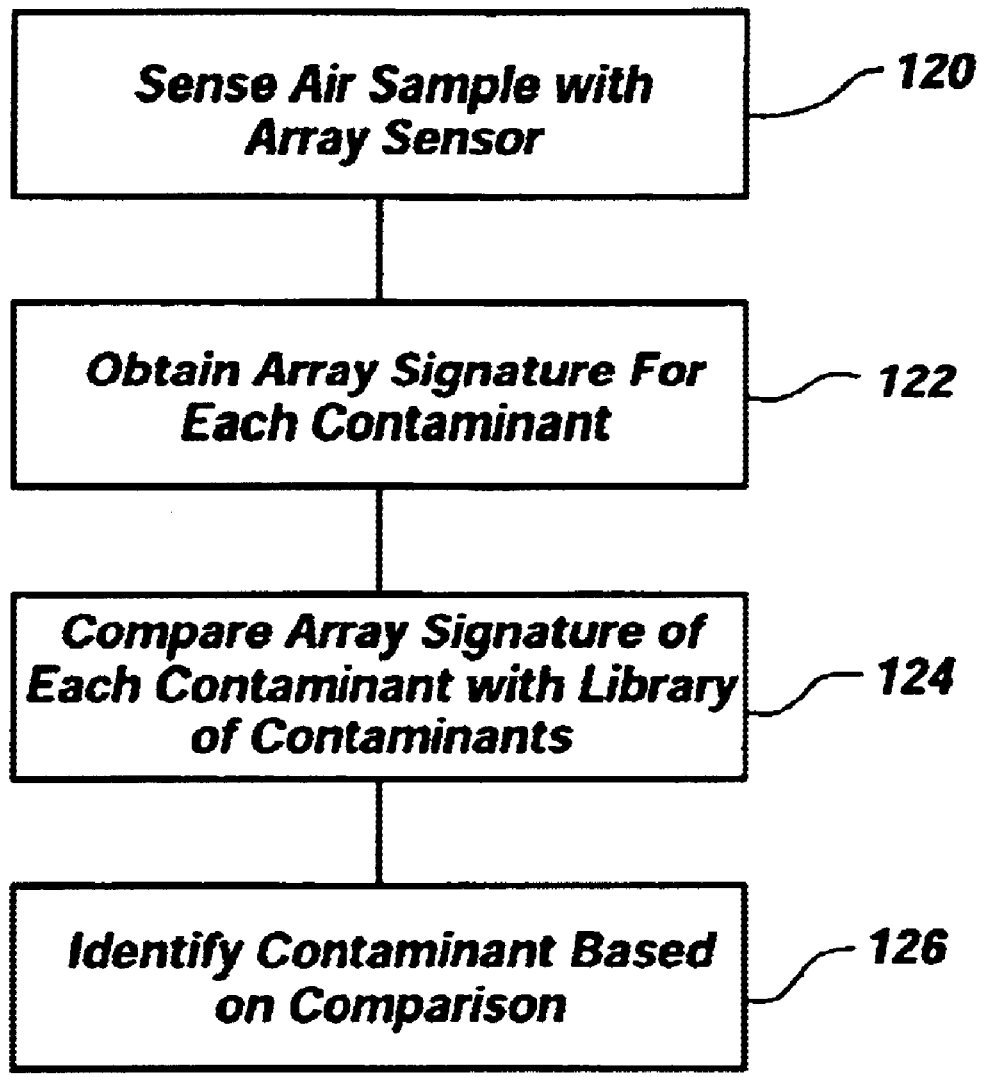
FIG. 7 is a flow chart of one embodiment of a method for identifying each contaminant in an air sample.

FIG. 7 is illustrative of a method for identifying contaminants found in an air sample. In step 120, a sensor array is used to evaluate an air sample from a zone. As mentioned previously, a zone includes the outdoor air, the recirculated air as well as other areas. In step 122, the array signature for each contaminant is obtained by the system. The array signature is the aggregate response of all sensors in the sensor array to each contaminant. As noted above, a sensor array can comprise one sensor or a plurality of sensors. The aggregate response of the sensors within the sensor array can be mapped to an n-dimensional space, as discussed previously, where n is the number of sensors in the sensor array. Because the array signature is mapped to n dimensions, the spatial location of the array signature within the n dimensions permits the contaminant to be identified or inferred.

In step 124, each contaminant in the air sample is inferred. The contaminants are identified by comparing each array signature with a database or library of known array signatures. The library of known array signatures is created by training the sensor array with many different contaminants and continually expanded as the array signatures of additional contaminants are recorded in the database or library. Note that the database is continually increasing as the array signature of additional contaminants is added to the database or library. Once the comparison of step 124 has been performed, step 126 identifies each contaminant based on the comparison. If a contaminant has an array signature that matches a stored array signature, then the contaminant is identified. If the n-dimensional location of the array signature is near a group of known array signatures, then the identity of the contaminant may be inferred. The method comprises an additional step of quantifying the amount of each contaminant in the air sample. This step is performed to evaluate the risk that the contaminant poses to personnel. After each contaminant has been identified, the system will take or issue corrective actions based on the analysis of the above described method.

The present invention has been described in terms of an HVAC system used to heat, cool and air condition a zone in a building, aircraft, ship, or similar occupied space. However, the ability of the sensor array to recognize a wide range of contaminants allows the present invention to function in other environments. For example, the sensor combination could be altered to recognize bio agents and chemicals used in warfare and terrorist activities. If a chemical agent were released in a public facility such as an airport, subway or hospital, the early detection of the chemical agent enables the population to be notified of evacuation procedures immediately as well as begin corrective action such as diluting the concentration of the chemical with additional forced air. The system could also be able to release a neutralizing agent or destroy the agent with pre-placed mitigation modules.

The present invention can also be used to monitor and control environments where produce or crops such as grain, fruits, vegetable, meats and dairy products are stored. For example, a series of sensor arrays could be placed in a potato cellar to sense the gases and heat produced by fermenting potatoes. Early detection of these contaminants permits the problem potatoes to be removed before substantial damage is done to the entire crop. In this example, the sensor arrays are used not only to sense the contaminants in the air but also indicate the location of the source of the contaminants.

Another application of the present invention is in a processing plant that makes semiconductors. Gases such as silane and arsenicals are used in the process, with silane being particularly dangerous. Altering the sensor array to detect these dangerous gases would enable fresh air to be sent to the contaminated area and the personnel could avoid injury. The present invention could also be used to monitor or indicate hazardous exposure conditions during industrial or mining activities, drug laboratories, confined animal feeding operations, global air monitoring, or arson investigation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An apparatus for monitoring and adjusting indoor air quality comprising:

sensing means for evaluating an air sample from a zone, wherein the sensing means outputs at least one signature representative of a separate contaminant in the air sample;

processor means for comparing the at least one signature with known signatures and identifying a known contaminant when the at least one signature corresponds to one of the known signatures and inferring a hazard of a known contaminant of a spatially near one of the known signatures on the separate contaminant of the air sample when the at least one signature fails to match one of the known signatures; and control means for adjusting the indoor air quality, wherein the control means performs corrective actions based on the comparison of the at least one signature and the known signatures.

2. An apparatus as in claim 1, wherein the sensing means comprises at least one sensor.

3. An apparatus as in claim 2, wherein the at least one sensor comprises: a carbon dioxide sensor, a carbon monoxide sensor, a hydrogen sulfide sensor, a sensor for sulfur dioxide, a sensor for nitrogen oxides, a sensor for volatile organic, a sensor for relative humidity, a sensor for pressure and a sensor for temperature.

4. An apparatus as in claim 1, wherein each at least one signature is representative of a different contaminant in the air sample, wherein each at least one signature is formed from the response of the sensing means to each contaminant.

5. An apparatus as in claim 1, wherein the processor means identifies the separate contaminants in the air sample by mapping each at least one signature according to the response of the sensing means to each separate contaminant.

6. An apparatus as in claim 1, wherein the known signatures are stored in a database, and wherein the database comprises an EPROM module.

7. An apparatus as in claim 6, wherein the known signatures contained in the EPROM module are compressed.

8. An apparatus as in claim 1, wherein the corrective actions include removing or reducing the concentration of each separate contaminant from the indoor air.

9. An apparatus as in claim 1, wherein the corrective actions include selecting a different source for the outside air.

10. An apparatus as in claim 1, wherein the corrective actions include reducing an air flow rate.

11. An apparatus as in claim 1, wherein a ratio of outside air to recirculated air is optimized.

12. An apparatus as in claim 1, wherein the exposure of the separate contaminant is minimized.

13. An apparatus as in claim 1, wherein the control means further comprises use of a LonWorks®, LAN or WAN for remote applications.

14. An apparatus for monitoring and adjusting indoor air quality comprising:

a sensor array to evaluate at least one air sample taken from at least one zone, wherein the sensor array produces at least one array signature representative of each contaminant in each air sample;

a library containing at least one known array signature, wherein each known array signature is representative of a separate contaminant; and an inference engine configured to compare the at least one array signature produced by the sensor array with the known array signatures contained in the library, wherein the inference engine identifies each separate contaminant in each air sample when the at least one array signature matches the at least one known array signature and infers hazards of a known array signature fail own contaminant of a spatially near one of the at least one known array signature when the at least one array signature fail to match the at least one known array signature.

15. An apparatus as in claim 14, further comprising control means for adjusting the indoor air quality in the at least one zone based on the comparison and the identification of each separate contaminant in each air sample.

16. An apparatus as in claim 15, wherein the inference engine issues corrective actions to adjust the quality of the indoor air, wherein the corrective actions are implemented by the control means.

17. An apparatus as in claim 16, wherein the corrective actions include removing or reducing a the concentration of each contaminant from the indoor air.

18. An apparatus as in claim 14, wherein the sensor array quantifies the amount of each contaminant present in each air sample.

19. An apparatus as in claim 14, wherein the sensor array comprises: a carbon dioxide sensor, a carbon monoxide sensor, a hydrogen sulfide sensor, a sensor for sulfur dioxide, a sensor for nitrogen oxides, a sensor for volatile organic, a sensor for relative humidity, a sensor for pressure and a sensor for temperature.

20. An apparatus as in claim 14, wherein the library is a database stored on a computer readable medium.

21. An apparatus as in claim 20, wherein the computer readable medium is an EPROM module.

22. An apparatus as in claim 20, wherein the known array signatures are stored in a compressed format.

23. An apparatus as in claim 14, wherein adjustments to the indoor air quality are made based on the quantity of each contaminant in each air sample.

24. An apparatus for monitoring and adjusting indoor air quality comprising:
    a sensor array to evaluate at least one air sample taken from at least one zone, wherein the sensor array produces at least one array signature representative of each contaminant in each air sample;
    a library containing at least one known array signature, wherein each known array signature is representative of a separate contaminant; and
    an inference engine configured to compare the at least one array signature produced by the sensor array with the known array signatures contained in the library, wherein the inference engine identifies each separate contaminant in each air sample, and wherein the adjustments to the indoor air quality are made based on the presence of an unknown contaminant that is inferred to be hazardous.

25. A system for monitoring and adjusting the indoor air of at least one zone comprising:
    an air delivery system connected to the at least one zone;
    at least one sensor array configured to sense and evaluate an air sample of each zone, wherein each sensor array produces at least one array signature representative of each air sample from each zone;
    a library containing at least one known array signature, wherein each known array signature is representative of a separate contaminant; and
    processor means for comparing the at least one array signature produced by the at least one sensor array with the at least one known array signature, wherein the processor means identifies each contaminant in each air sample from each zone when the at least one array signature matches one of the at least one known array signature and the processor means infers hazards of a spatially near one of the at least one known array signature when the at least one array signature fail to match one of the at least one known array signature.

26. A system as in claim 25, further comprising control means for adjusting an indoor quality in each zone based on the comparison and the identification of each contaminant in each air sample from each zone.

27. A system as in claim 25, wherein the at least one sensor array quantifies the amount of each contaminant present in each air sample.

28. A system as in claim 25, wherein the at least one sensor array comprises: a carbon dioxide sensor, a carbon monoxide sensor, a hydrogen sulfide sensor, a sensor for sulfur dioxide, a sensor for nitrogen oxides, a sensor for volatile organic, a sensor for relative humidity, a sensor for pressure and a sensor for temperature.

29. A system as in claim 25, wherein the library is a database stored on a computer readable medium.

30. A system as in claim 29, wherein the computer readable medium is an EPROM module.

31. A system as in claim 29, wherein the known array signatures are stored in a compressed format.

32. A system as in claim 25, wherein the processor means comprises an inference engine which compares the at least one array signature with the database of at least one known array signatures and identifies each contaminant in each air sample.

33. A system as in claim 32, wherein the inference engine issues corrective actions which are implemented by the processor means.

34. A system as in claim 33, wherein the corrective actions include removing or reducing a concentration of each contaminant from the indoor air.

35. A system as in claim 25, wherein adjustments to the indoor air quality are made based on the quantity of each contaminant in each air sample.

36. A system as in claim 25, wherein the air delivery system comprises a heating, cooling and air conditioning system.

37. A method for monitoring and adjusting the quality of indoor air in at least one zone comprising the steps of:
    obtaining sample air from each zone;
    obtaining array signatures for each contaminant in the sample air using a sensor array;
    comparing the array signatures with a library of known array signatures;
    identifying each contaminant in the sample air from each zone based on the comparison when the array signatures matches known array signatures;
    inferring hazards of a spatially near one of the known array signatures when the array signtures fail to match the known array signatures; and
    adjusting the quality of indoor air for each zone.

38. The method of claim 37, further comprising the steps of:
    obtaining array signatures for each contaminant in the sample air; and
    comparing the array signatures with the library of known array signatures.

39. A computer-readable medium having computer-executable instructions for performing the steps recited in claim 37.

40. A method for identifying each contaminant in an air sample obtained from a zone comprising the steps of:
    sensing the air sample with a sensor array;
    obtaining an array signature for each contaminant in the air sample;
    comparing the array signature of each contaminant with a library containing identified array signatures of identified contaminants;
    identifying each contaminant in the air sample based on the comparison when the array signature matches identified array signatures; and
    inferring hazards of a spatially near one of the identified array signatures when the array signatures fail to match the identified array signatures.

41. A computer-readable medium having computer-executable instructions for performing the steps recited in claim 40.

* * * * *